(12) United States Patent
Minami

(10) Patent No.: US 8,684,582 B2
(45) Date of Patent: Apr. 1, 2014

(54) SOLAR SIMULATOR

(75) Inventor: Kohji Minami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 374 days.

(21) Appl. No.: 13/203,438

(22) PCT Filed: Jan. 28, 2010

(86) PCT No.: PCT/JP2010/000512
§ 371 (c)(1),
(2), (4) Date: Sep. 27, 2011

(87) PCT Pub. No.: WO2010/143329
PCT Pub. Date: Dec. 16, 2010

(65) Prior Publication Data
US 2012/0014085 A1    Jan. 19, 2012

(30) Foreign Application Priority Data
Jun. 12, 2009 (JP) ................................ 2009-141658

(51) Int. Cl.
*F21V 7/04* (2006.01)
(52) U.S. Cl.
USPC .............................................. 362/613; 362/2
(58) Field of Classification Search
USPC ................ 362/1, 2, 230, 231, 613, 626, 602
See application file for complete search history.

(56) References Cited

U.S. PATENT DOCUMENTS 4,641,227 A * 2/1987 Kusuhara ...................... 362/231
6,481,881 B2 * 11/2002 Tiesler-Wittig ............... 362/554
7,224,501 B2 * 5/2007 Kojima ............................ 359/16
2005/0280776 A1 * 12/2005 Suzuki .......................... 351/224
2006/0028724 A1   2/2006 Li
(Continued)

FOREIGN PATENT DOCUMENTS

CN       101248384 A     8/2008
JP       58-132212 A     8/1983
(Continued)

OTHER PUBLICATIONS

Office Action issued Apr. 28, 2013 in connection with Chinese Application No. 201080011802.2 with English translation.
(Continued)

*Primary Examiner* — Julie Bannan
(74) *Attorney, Agent, or Firm* — Edwards Wildman Palmer LLP; David G. Conlin; Stephen D. LeBarron

(57) ABSTRACT

Xenon light emitted from a xenon light source heads for a wavelength-selecting mirror through a taper coupler and an air mass filter. The wavelength-selecting mirror reflects a short wavelength component of the xenon light and emits the short wavelength component to a taper member. Halogen light emitted from a halogen light source heads for a wavelength-selecting mirror through a taper coupler and a reflecting mirror. The wavelength-selecting mirror transmits a long wavelength component of the halogen light and emits the long wavelength component to the taper member. The taper member has width gradually decreasing from an entrance plane for light to an exit plane for the light. The light emitted from the taper member is changed so that a radiation directivity of a component originating from the xenon light becomes similar to a radiation directivity of a component originating from the halogen light. This makes it possible to provide a solar simulator performing irradiation of artificial sunlight having uniform illumination distribution onto an irradiation-target surface.

8 Claims, 8 Drawing Sheets

(56) References Cited

U.S. PATENT DOCUMENTS

| | | |
|---|---|---|
| 2006/0126178 A1 | 6/2006 | Li |
| 2008/0180640 A1* | 7/2008 | Ito .................................. 353/31 |
| 2010/0271838 A1 | 10/2010 | Yamaguchi |

FOREIGN PATENT DOCUMENTS

| | | |
|---|---|---|
| JP | 61-131301 A | 6/1986 |
| JP | 61-296601 | 12/1986 |
| JP | 04-133017 A | 5/1992 |
| JP | 05-295962 A | 11/1993 |
| JP | 8-235903 A | 9/1996 |
| JP | 09-099106 A | 4/1997 |
| JP | 09-306201 A | 11/1997 |
| JP | 2002-148704 A | 2/2002 |
| JP | 2003-028785 A | 1/2003 |
| JP | 2003-331630 A | 11/2003 |
| JP | 2008-282663 A | 11/2008 |
| WO | WO-2007/086456 A1 | 8/2007 |
| WO | WO-2010/143328 A1 | 12/2010 |

OTHER PUBLICATIONS

English version of International Search report dated Mar. 16, 2010 in connection with PCT/JP2010/000512.

* cited by examiner

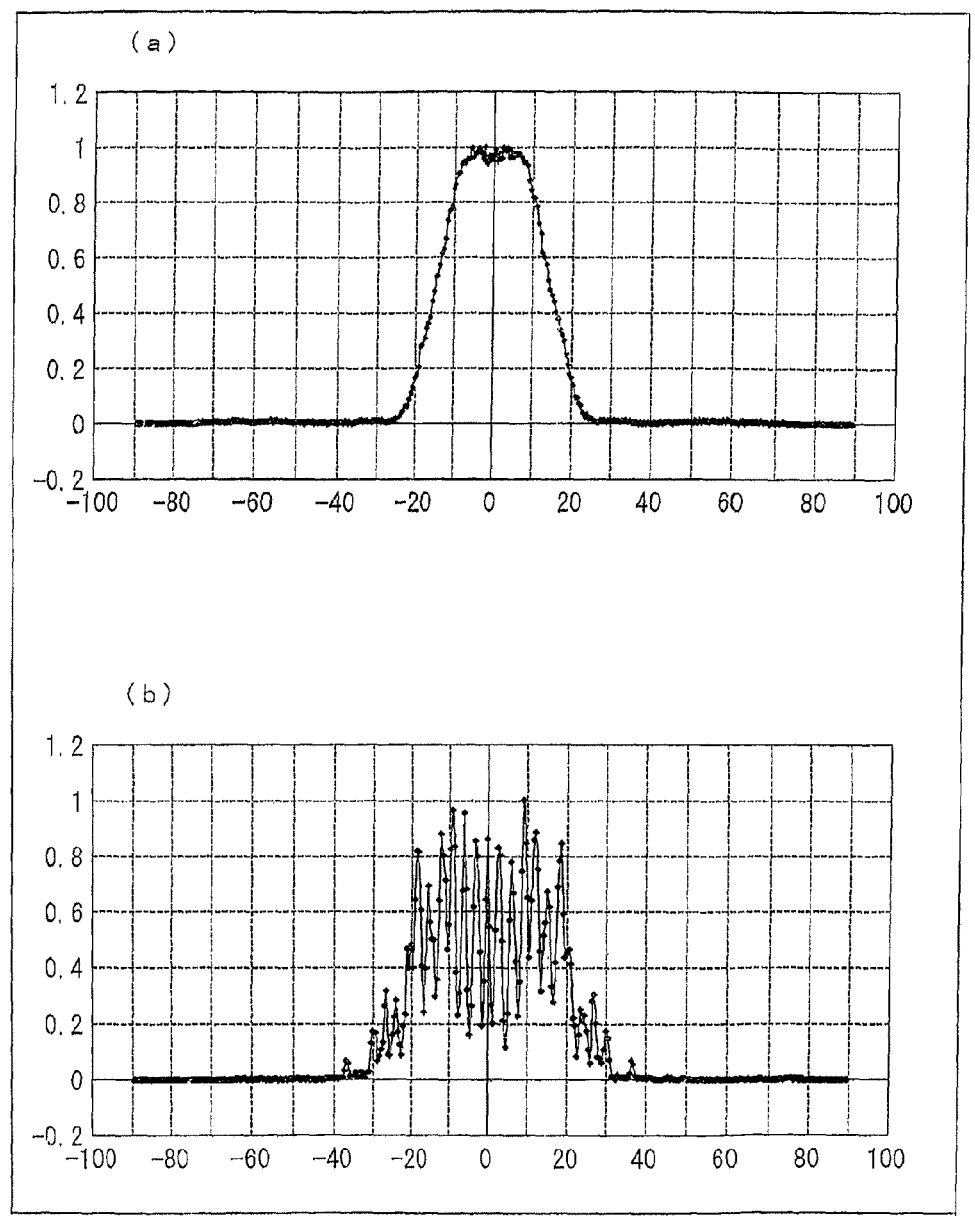

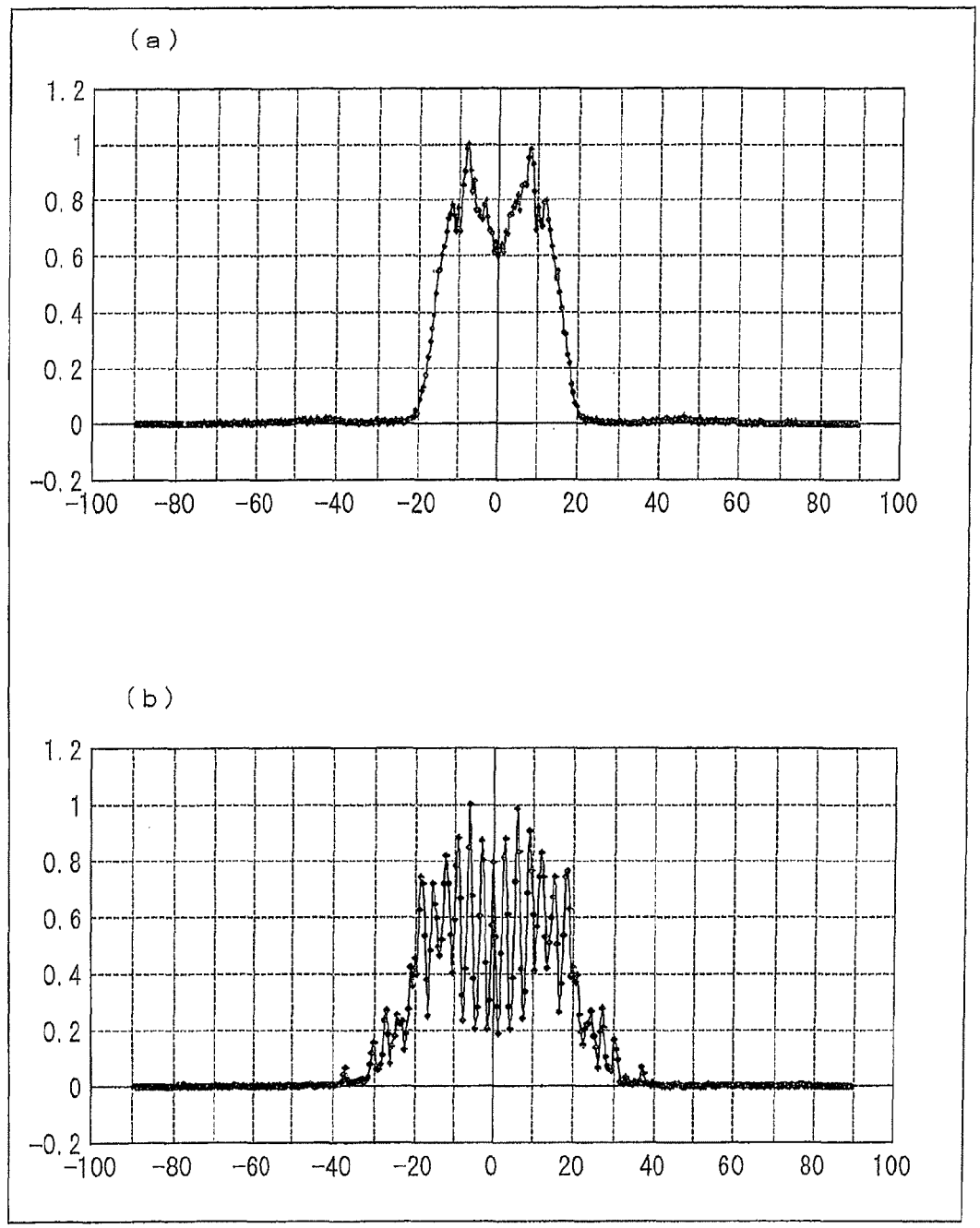

SOLAR SIMULATOR
>
> ## TECHNICAL FIELD
>
> The present invention relates to a solar simulator performing artificial sunlight irradiation.
>
> ## BACKGROUND ART
>
> In recent years, demands for an apparatus capable of performing irradiation of artificial light (artificial sunlight, pseudo-sunlight) similar to sunlight have been increasing. In particular, accompanying rapid development and diffusion of a solar cell technology, there arise demands for an apparatus capable of performing irradiation of very exact artificial sunlight that can be suitably used for testing, measurement, and experiment of a solar cell.
>
> A key requirement which the artificial sunlight is required to satisfy is to have a light emission spectral close to natural sunlight. For satisfying this requirement, first, an attempt is made to obtain, as artificial sunlight, light that is from an incandescent light bulb and that has passed through a filter of some kind. One example of such a technique is disclosed in Patent Literature 1. According to the technique of Patent Literature 1, a water filter is provided in a light path of light from an incandescent filament lamp, so as to sufficiently improve proximity of spectral distribution of the light to spectral distribution of incandescent sunlight.
>
> However, the technique of Patent Literature 1 has a problem such that an apparatus for this technique indispensably requires a mechanism of a complex optical system. Therefore, an apparatus performing irradiation of artificial sunlight by use of a simpler optical system has been developed. One example of such a technique is disclosed in Patent Literature 2.
>
> According to the technique of Patent Literature 2, there is an optically open box frame below a surface for irradiating a solar cell. This box frame is partitioned so as to form neighboring discrete chambers that are optically independent and that respectively have upper surfaces optically open. Then, the respective chambers are provided with a halogen lamp and a xenon lamp together with respective reflector plates for adjusting uneven illumination. The reflector plates are provided on respective backsides of the halogen lamp and the xenon lamp facing respective open sections of the chambers. In addition, the open sections are provided with an optical filter exclusive for the halogen lamp and an optical filter exclusive for the xenon filter, respectively. In this configuration, irradiation of artificial sunlight is performed from underneath on a light-receiving surface of an object to be measured, by use of light obtained by turning on the halogen lamp and the xenon lamp.
>
> ## CITATION LIST
>
> ### Patent Literatures
>
> [Patent Literature 1]Japanese Patent Application Publication, Tokukaishou, No. 61-131301 A (Publication Date: Jun. 19, 1986)
>
> [Patent Literature 2]
> Japanese Patent Application Publication, Tokukai, No. 2002-48704 A (Publication Date: Feb. 15, 2002)
>
> ## SUMMARY OF INVENTION
>
> ### Technical Problem
>
> The technique of Patent Literature 1 employs an optical system that has a diverging radiation direction of light from each of a halogen lamp and a xenon lamp that are light sources. Accordingly, when the light from both the halogen lamp and the xenon light irradiates an irradiation-target surface, it is difficult to obtain uniformity in illumination distribution of light on the irradiation-target surface. Therefore, the technique of Patent Literature 1 has a problem in performance for uniforming artificial sunlight to be used in irradiation performed by an irradiation apparatus.
>
> The present invention is attained in view of the above problem. An object of the present invention is to provide a solar simulator that performs, on an irradiation-target surface, irradiation of artificial sunlight having uniform illumination distribution.
>
> ### Solution to Problems
>
> In order to solve the above problems, the solar simulate of the present invention performing irradiation of artificial sunlight on an irradiation-target surface, the solar simulator includes:
>
> a first light source emitting first light;
>
> a first optical filter adjusting a light emission spectrum of the first light emitted;
>
> a second light source emitting second light different from the first light;
>
> a second optical filter adjusting another light emission spectrum of the second light emitted;
>
> light selecting means selecting a short wavelength component of the first light whose light emission spectrum is adjusted and a long wavelength component of the second light whose light emission spectrum is adjusted, and outputting the short wavelength component and the long wavelength component that are selected;
>
> light transmitting means transmitting the short wavelength component and the long wavelength component that are outputted, the light transmitting means having width gradually decreasing from an entrance plane for the short wavelength component and the long wavelength component to an exit plane for the short wavelength component and the long wavelength component;
>
> a light guide plate which the short wavelength component and the long wavelength component that exit from the light transmitting means enter; and
>
> light scattering means scattering, towards the irradiation-target surface, the short wavelength component and the long wavelength component that have entered the light guide plate, the light scattering means being formed inside the light guide plate.
>
> According to the configuration, the solar simulator synthesizes the first light and the second light and emits the synthesized light as artificial sunlight onto an irradiation-target surface. In this light emission, the light emitted from the light selecting means is not configured to directly enter the light guide plate but is configured to once enter the light transmitting means. The light transmitting means is configured to have width gradually decreasing from the entrance plane to the exit plane. This configuration changes the random radiation directivities of the light passing inside the light transmitting means to a radiation directivity in a uniform direction.
>
> Due to an effect of the light transmitting means, the component of the first light and the component of the second light of the light entering the light guide plate come to have a similar radiation directivity. Accordingly, the light scattered by the light scattering means on the light guide plate reaches as artificial sunlight onto the irradiation-target surface, while keeping uniformity in illumination distribution.

As described above, the solar simulator can irradiate an irradiation-target surface, by use of artificial sunlight having uniform illumination distribution.

For a fuller understanding of the nature and advantages of the invention, reference should be made to the ensuing detailed description taken in conjunction with the accompanying drawings.

Advantageous Effects of Invention

As described above, the solar simulator of the present invention can irradiate the irradiation-target surface, by use of artificial sunlight having uniform illumination distribution.

BRIEF DESCRIPTION OF DRAWINGS

FIG. 1 is a diagram illustrating a configuration of a relevant part of a solar simulator according to one embodiment of the present invention.

FIG. 2 is a diagram magnifying a part of the solar simulator.

FIG. 3 is a diagram illustrating a configuration of taper couplers.

FIG. 4 is a diagram illustrating a condition of reflection of light inside a taper member.

FIG. 5(a) is a diagram illustrating directional distribution of radiation of xenon light that has not yet entered a taper coupler.

FIG. 5(b) is a diagram illustrating directional distribution of radiation of xenon light that has exited from the taper member.

FIG. 6(a) is a diagram illustrating directional distribution of radiation of halogen light that has not yet entered a taper coupler.

FIG. 6(b) is a diagram illustrating directional distribution of radiation of halogen light that has exited from the taper member.

FIG. 7 is a diagram illustrating a configuration of a relevant part of a solar simulator according to one embodiment of the present invention.

FIG. 8 is a diagram magnifying a part of the solar simulator.

FIG. 9 is a diagram illustrating a configuration of a bending section.

FIG. 10(a)

FIG. 10(a) is a diagram illustrating directional distribution of radiation of xenon light that has not yet entered a taper coupler.

FIG. 10(b)

FIG. 10(b) is a diagram illustrating directional distribution of radiation of xenon light that has exited from the taper member.

FIG. 11(a)

FIG. 11(a) is a diagram illustrating directional distribution of radiation of halogen light that has not yet entered a taper coupler.

FIG. 11(b)

FIG. 11(b) is a diagram illustrating directional distribution of radiation of halogen light that has exited from the taper member.

DESCRIPTION OF EMBODIMENTS

[Embodiment 1]

The following explains one embodiment of the present invention, with reference to FIGS. 1 through 7. The present embodiment explains in detail a solar simulator 30 that performs irradiation of artificial sunlight on an irradiation-target surface 12. The artificial sunlight is one type of artificial sunlight and has a light emission spectrum extremely close in every respect to light emission spectrum of natural light (sunlight). The solar simulator 30 of the present embodiment performs irradiation of synthetic light of xenon light and halogen light, as the artificial sunlight. On the irradiation-target surface, for example, a solar cell is provided.

(Configuration of Solar Simulator 30)

Figure 1:
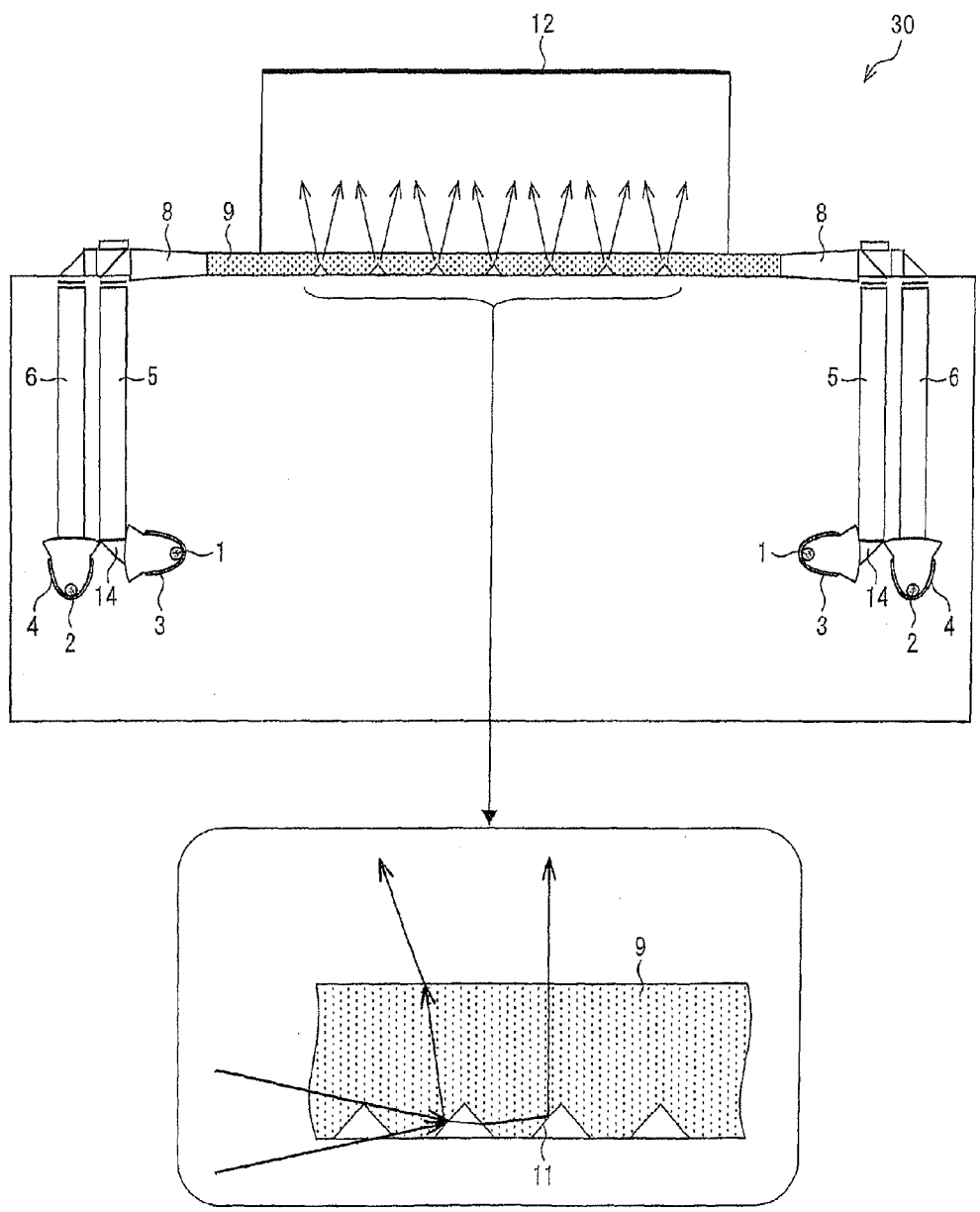
FIG. 1
Figure 2:
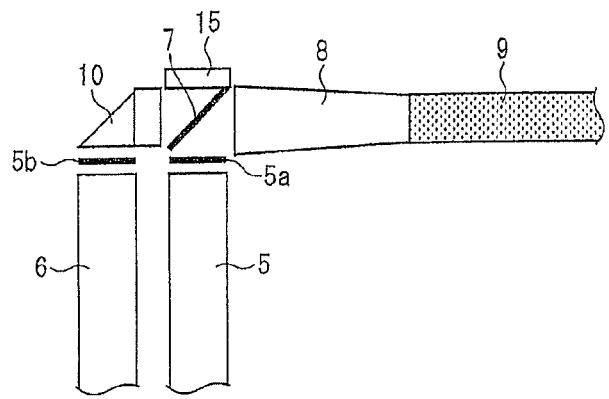
FIG. 2

FIG. 1 is a diagram illustrating a configuration of a relevant part of the solar simulator 30 according to one embodiment of the present invention. FIG. 2 is a diagram magnifying a part of the solar simulator 30. As shown in FIGS. 1 and 2, the solar simulator 30 includes a xenon light source 1 (first light source), a halogen light source 2 (second light source), a reflector 3, a reflector 4, a taper coupler 5, an air mass filter 5a (first optical filter), a taper coupler 6, an air mass filter 5b (second optical filter), a wavelength-selecting mirror 7 (light-selecting means), a taper member 8 (light transmitting means), a light guide plate 9, a reflecting mirror 10, scattering grooves 11 (light scattering means), and a reflecting mirror 15.

The xenon light source 1 is provided inside the reflector 3 and emits xenon light (first light) having a predetermined light emission spectrum. In the present embodiment, the xenon light source 1 is a tubular xenon lamp whose length is in a paper depth direction. The number of the xenon light source 1 may be one or more. The reflector 3 has a cross section having a bell shape, and collects light emitted from the xenon light source 1 to a light exit surface. The light exit surface of the reflector 3 is connected with a light reflecting section 14. The light reflecting section 14 is one type of a prism. This light reflecting section 14 reflects the light from the xenon light source 1 into a substantially perpendicular direction so as to lead the light to one end of the taper coupler 5.

Meanwhile, the halogen light source 2 is provided inside the reflector 4 and emits halogen light (second light different from the first light) having a predetermined light emission spectrum. In the present embodiment, the halogen light source 2 is a tubular halogen lamp whose length is in a paper depth direction. The number of this halogen light source 2 may be one or more. The reflector 4 has a cross section having a bell shape, and collects light emitted from the halogen light source 2 to a light exit surface. The light exit surface is connected with one end of the taper coupler 6. Accordingly, the reflector 4 directly leads the light from the halogen light source 2 to the one end of the taper coupler 6.

As shown in FIGS. 1 and 2, the taper coupler 5 is made of a light guiding body. This taper coupler 5 is thin and long, and has an entrance face and an exit face for the xenon light. The taper coupler 5 leads the xenon light having entered through the entrance face to the exit face. The taper coupler 5 has a function to change a radiation directivity of the xenon light that has entered, while leading the xenon light to the exit face.

Meanwhile, the taper coupler 6 is made of a light guiding body. The taper coupler 6 is long and thin, and has an entrance face and an exit face for the halogen light. The taper coupler 6 is disposed in parallel to the taper coupler 5, and leads the halogen light having entered through the entrance face to the exit face. The taper coupler 6 has a function to change a radiation directivity of the halogen light, while leading the halogen light to the exit face.

(Configurations of Taper Coupler 5 and Taper Coupler 6)

Figure 3:
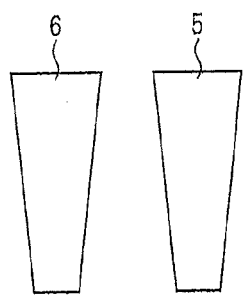
FIG. 3
Figure 4:
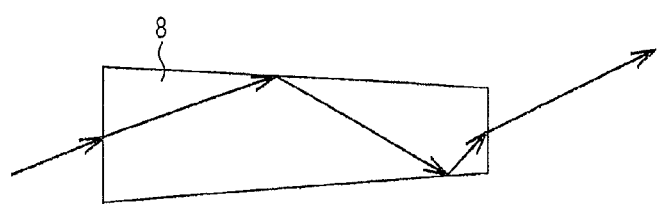
FIG. 4
Figure 5:
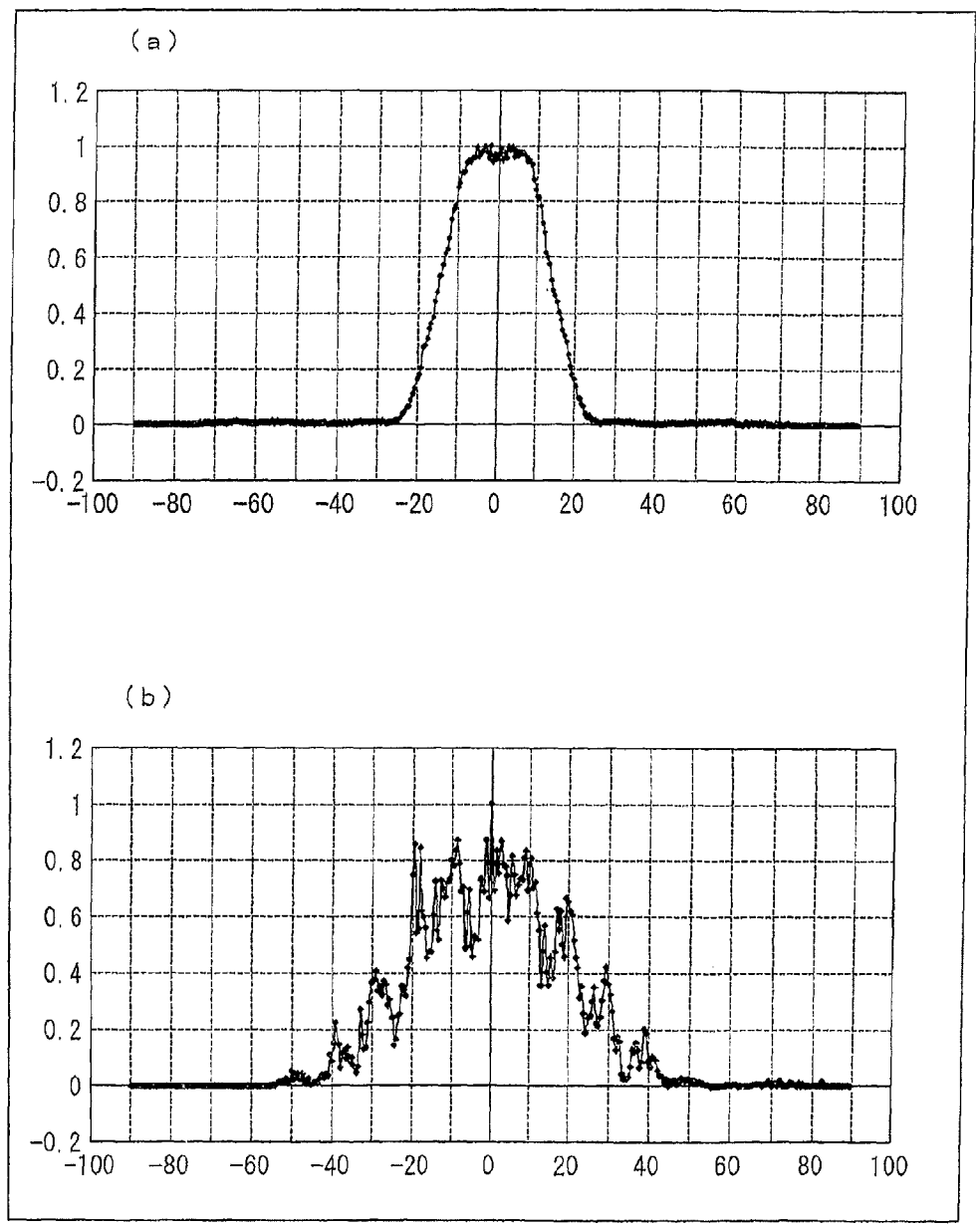
FIG. 5(a)
FIG. 5(b)
Figure 6:
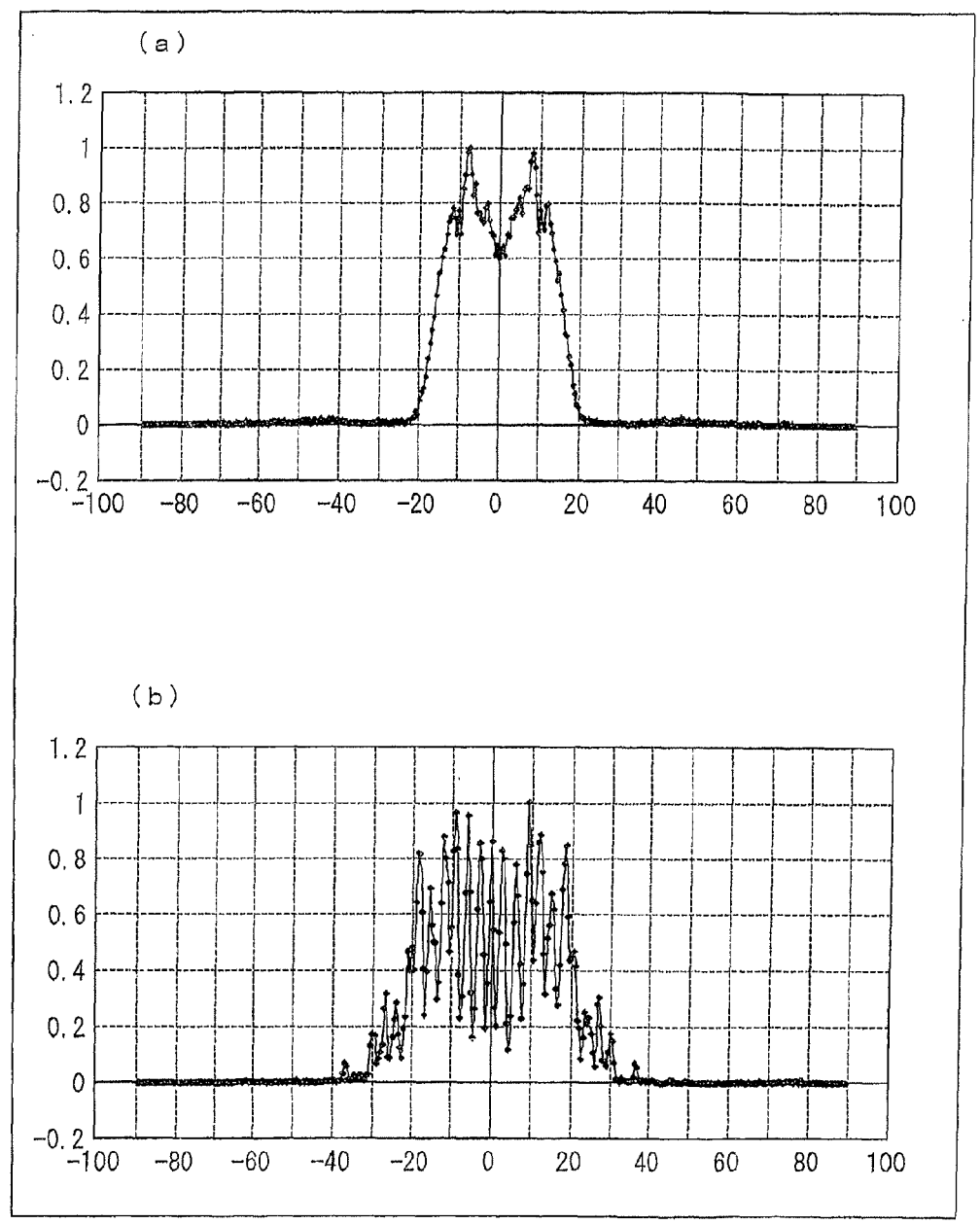
FIG. 6(a)
FIG. 6(b)

FIG. 3 illustrates configurations of the taper coupler 5 and the taper coupler 6. FIG. 3 is a diagram illustrating the configurations of the taper coupler 5 and the taper coupler 6. As shown in FIG. 3, the taper coupler 5 is configured to gradually decrease a width (short axis) of the light guiding body from one end (the entrance face of the light) to the other end (the exit face of the light). Immediately after having entered through the entrance face of the taper coupler 5, the xenon light has radiation directions randomly scattered. However, while the xenon light passes through the taper coupler 5 configured as shown in FIG. 4, the radiation directions of the xenon light are changed to be one uniform direction.

Meanwhile, the taper coupler 6 is configured to gradually decrease a width (short axis) of the light guiding body from one end (the entrance face of the light) to the other end (the exit face of the light). Therefore, though the halogen light having entered through the entrance face has random radiation directions at the entrance, the radiation directions of the halogen light are changed to be one uniform direction when the halogen light exits.

(Reflection of Xenon Light)

The other end (the exit face) of the taper coupler 5 is provided with an air mass filter 5a. The air mass filter 5a has a transmission characteristic optimized for the light emission spectrum of the xenon light. Accordingly, the air mass filter 5a adjust the light emission spectrum of the xenon light having exited from the exit face of the taper coupler 5. The xenon light having passed through the air mass filter 5a heads for the wavelength-selecting mirror 7 disposed at an angle of 45° with respect to the air mass filter 5a. The wavelength-selecting mirror 7 reflects a short wavelength component of the xenon light and leads the reflected component to one end of the taper member 8 (entrance plane).

However, not all the xenon light having exited from the air mass filter 5a is necessarily led to the taper member 8 through an identical path. That is, a part of the xenon light directly enters the taper member 8 but not via the wavelength-selecting mirror 7. As a result, a loss of the light that has been reflected by the wavelength-selecting mirror 7 is at a level different from a level of a loss of the light that has not been reflected by the wavelength-selecting mirror 7. This difference consequently changes the radiation directivity of the xenon light before the entrance of the xenon light into the taper member 8.

(Transmission of Halogen Light)

The other end (exit face) of the taper coupler 6 is provided with the air mass filter 5b. The air mass filter 5b has a transmission characteristic optimized for a light emission spectrum of the halogen light. Accordingly, the air mass filter 5b adjust the light emission spectrum of the halogen light having exited from the, taper coupler 6. The halogen light having passed through the air mass filter 5b enters the reflecting mirror 10.

The reflecting mirror 10 is one type of a prism. This reflecting mirror 10 reflects all the light that has entered the reflecting mirror 10, towards the wavelength-selecting mirror 7 by using internal reflection. Because the internal reflection is used, the radiation directivity of the halogen light having exited from the reflecting mirror 10 is kept the same as that before the entrance into the reflecting mirror 10. The wavelength-selecting mirror 7 transmits a long wavelength component of the halogen light coming from the reflecting mirror 10 and leads the light transmitting the wavelength-selecting mirror 7 to the taper member 8.

However, not all the halogen light having exited from the reflecting mirror 10 is necessarily led to the taper member 8. Light having headed for the reflecting mirror 15 (light having traveled upward in FIG. 2) among the halogen light having exited from the reflecting mirror 10 is reflected by the reflecting mirror 15 and heads for the taper member 8. Meanwhile, light having headed for a side opposite to the reflecting mirror 15 (light having traveled downward in FIG. 2) among the halogen light having exited from the reflecting mirror 10 is not reflected but disappears afterward. Note that a component that disappears as described above is small in amount and this causes no specific problem in practice.

As described above, in a selecting operation of the wavelength-selecting mirror 7, the xenon light and the halogen light are synthesized and enter the taper member 8. More specifically, the wavelength-selecting mirror 7 selects the short wavelength component of the xenon light and the long wavelength component of the halogen light, and the components selected is synthesized so as to produce synthesized light. Then, the synthesized light is led to the entrance plane of the taper member 8. In this selecting operation, the short wavelength component of the xenon light is a component having a wavelength of 750 nm or less while the long wavelength component of the halogen light is a component having a wavelength of 750 nm or more. By selecting the component having the wavelength of 750 nm or less from the xenon light, it is possible to remove an intense bright-line component in the light emission spectrum of the light emitted from the xenon light source 1. This provides an advantageous effect such that the air mass filter can be easily designed.

(Details of Taper Member 8)

The taper member 8 is made of a light guiding member and configured to gradually decrease width (a short axis of the taper member 8) of the light guiding body from one end (entrance plane of light) to the other end (exit plane of light). In other words, a cross sectional area in a short axis direction of the taper member 8 gradually decreases from the entrance plane to the exit plane of the taper member 8.

For example, in FIG. 2, the width of the light guide is linearly decreased but the configuration is not limited to this. The decrease may be a curved decrease or a stepwise decrease. In any case, the taper member 8 has the entrance plane whose width (area) is larger than a width (area) of the exit plane.

In the taper member 8, a difference between the width of the entrance plane and the width of the exit plane is preferably 17 mm or less. When this condition is satisfied, light leakage from the taper member can be prevented. Further, a whole length of the taper member 8 is preferably 300 mm or less. When this condition is satisfied, the light leakage from the taper member 8 can be prevented as in the case described above.

The light having entered the taper member 8 travels while being repeatedly reflected inside the taper member 8. FIG. 4 shows a condition of the light traveling inside the taper member 8. FIG. 4 is a diagram illustrating the condition of reflection of the light inside the taper member 8. Due to an effect of the repeated reflection, distribution of radiation angles of light having passed through the taper member 8 is changed. Because the synthesized light of the xenon light and the halogen light enters the taper member 8, the radiation angles of both the xenon light and the halogen light change. As a result, the radiation directivity of the xenon light comes to substantially coincide with the radiation directivity of the halogen light.

(Effects of Present Embodiment)

FIG. 5(a) is a diagram illustrating directional distribution of radiation of the xenon light that has not yet entered the taper coupler 5. FIG. 5(b) is a diagram illustrating directional distribution of radiation of the xenon light that has exited from the taper member 8. FIG. 6(a) is a diagram illustrating directional distribution of radiation of the halogen light that has not yet entered the taper coupler 6. FIG. 6(b) is a diagram illustrating directional distribution of radiation of the halogen light that has exited from the taper member 8.

As shown in FIGS. 5(a) and 6(b), before the entrance to the taper member 8, the directional distribution of the radiation of the xenon light is different from the directional distribution of the radiation of the halogen light. In other words, the directional distribution of the radiation of the xenon light has one peak, whereas the directional distribution of the radiation of the halogen light has two peaks.

Meanwhile, as shown in FIGS. 5(b) and 6(b), after exit of the xenon light and the halogen light from the taper member 8, the directional distribution of the radiation of the xenon light substantially coincides with the directional distribution of the radiation of the halogen light.

The solar simulator 30 ultimately performs irradiation of artificial sunlight (synthesized light of the xenon light and the halogen light) from a surface of the light guide plate 9 onto the irradiation-target surface 12. At this irradiation, the solar simulator 30 utilizes a mechanism for scattering light on the light guide plate 9. On the light guide plate 9, a plurality of scattering grooves 11 are provided. Each of the plurality of scattering grooves 11 has a light-scattering characteristic. As shown in FIG. 2, the light having entered an inside of the light guide plate 9 is scattered by the scattering grooves 11 and led toward the irradiation-target surface 12.

In general, uniformity of illumination can be improved to a certain extent by well-designing a pitch and a shape of the scattering grooves 11. However, first of all, the pitch and the shape of the scattering grooves 11 need to be optimized in accordance with a radiation directivity of light entering the light guide plate 9. Therefore, in a case where two types of light (the xenon light and the halogen light) having different radiation directivities enter the light guide plate. 9, it is difficult optimize the pitch and the shape so as to be appropriate for both radiation directivities of the two types of light.

Accordingly, in a case where both the two types of light (precisely, the synthesized light of the xenon light and the halogen light) in the conditions shown in FIGS. 5(a) and 6(a) enter the light guide 9, light emitted from the light guide plate 9 onto the irradiation-target surface 12 becomes uneven even if disposition, a pitch, and the like of the scattering grooves 11 are controlled (optimized). Accordingly, if these types of light (synthesized light) enter the light guide plate 9, the light for irradiation onto the irradiation-target surface 12 from the light guide plate 9 becomes uneven and does riot become uniform.

Meanwhile, in the present embodiment, one end of the light guide plate 9 is connected to the exit plane of the taper member 8. Therefore, the synthesized, light that has been exited from the taper member 8 and whose radiation directivity is uniform is led into the inside of the light guide plate 9. As a result, the solar simulator 30 can perform irradiation of light (the xenon light and the halogen light) that has passed through different optical systems and that also has a uniform radiation directivity, onto the irradiation-target surface 12. This makes it possible to improve uniformity of illumination distribution of light used for irradiation onto the irradiation-target surface 12. Further, the present embodiment can provide a better effect as compared with a case where uniformity of illumination is improved only by the optimization of the scattering grooves 11. Moreover, the uniformity of the illumination distribution can be further improved by a combination of the optimization of the pitch and the shape of the scattering grooves 11 and utilization of the taper member 8 of the present invention.

(Plurality of Optical System Sets)

As shown in FIG. 1, the solar simulator 30 includes two optical system sets each including a xenon light optical system and a halogen light optical system. One of the optical system sets is provided to one end (on the left side of FIG. 1) of a housing of the solar simulator 30 and the other one of the optical system sets is provided to the other end (on the right side of FIG. 1) of the housing of the solar simulator 30. Light from the one of the optical system sets enters one end of the light guide plate 9, while light from the other one of the optical system sets enters the other end of the light guide plate 9. This makes it possible to improve an intensity of the artificial sunlight for irradiation from the solar simulator 30.

Further, in one optical system set, a position of the xenon light optical system and a position of the halogen optical system may be configured to be opposite each other, as compared with the configuration shown in FIG. 1. In such a case, the wavelength-selecting mirror 7 reflects a long wavelength component of the halogen light having exited from the air mass filter 5a and leads the long wavelength component to the taper member 8, while transmitting a short wavelength component of the xenon light having exited from the air mass filter 5b and leads the short wavelength component to the taper member 8. In other words, the wavelength-selecting mirror 7 only needs to have a characteristic to reflect or transmit the short wavelength component of the xenon light and to transmit or reflect the long wavelength component of the halogen light.

The irradiation-target surface 12 stretches to a certain extent in a paper depth direction. Accordingly, the solar simulator 30 shown in FIG. 1 can be configured by disposing a plurality of optical system sets in the paper depth direction, in accordance with an area of the irradiation-target surface 12.

[Embodiment 2]

Figure 7:
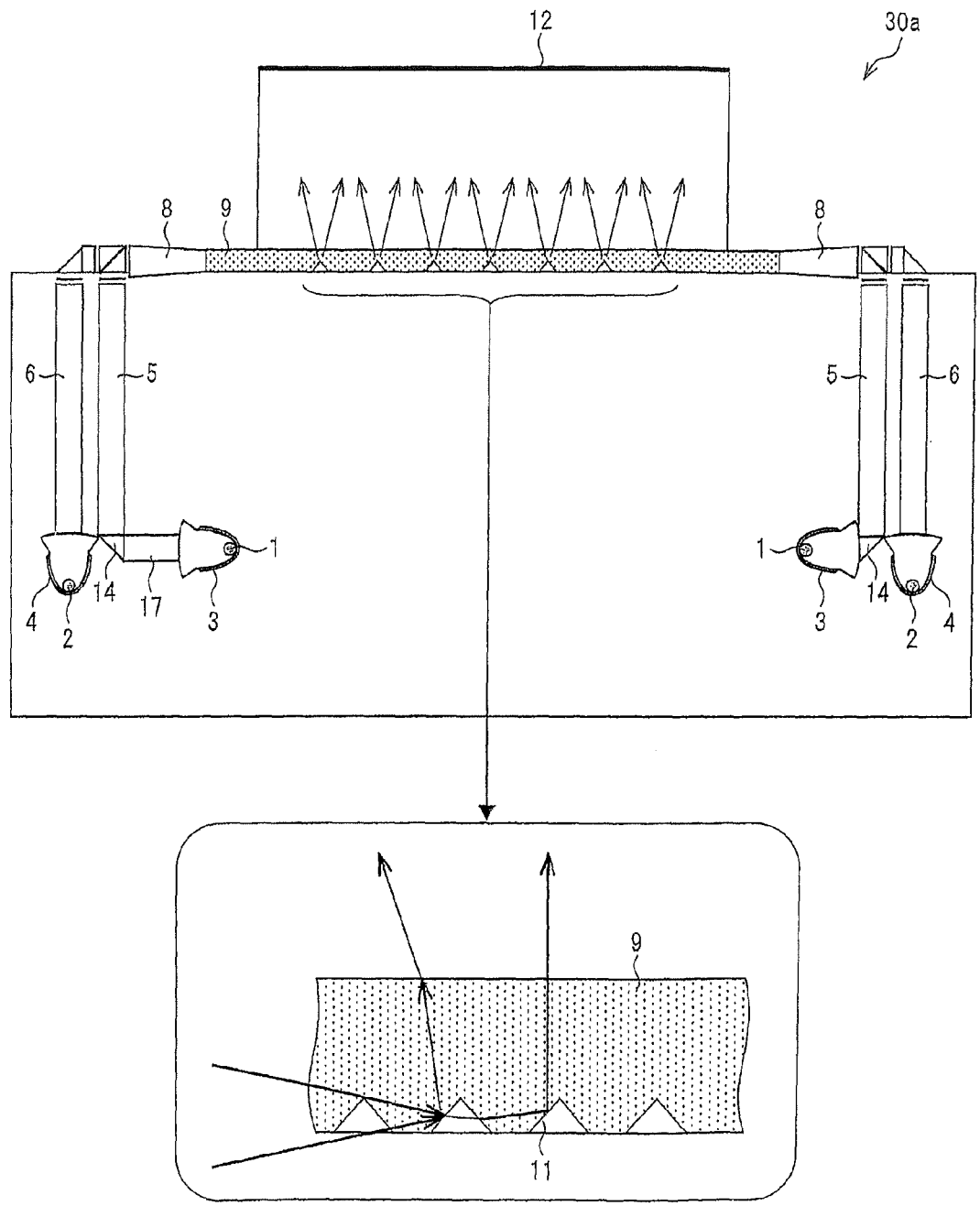
FIG. 7
Figure 8:
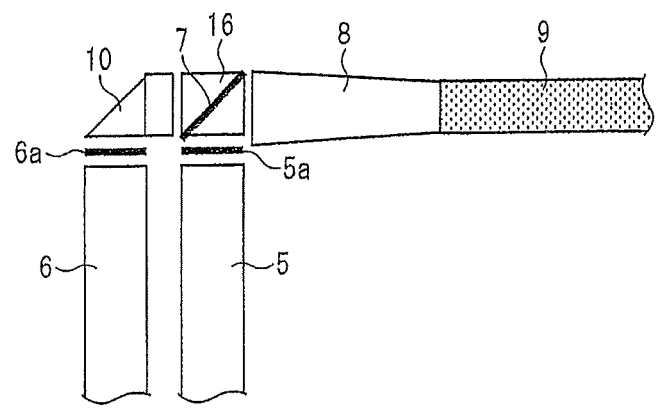
FIG. 8
Figure 9:
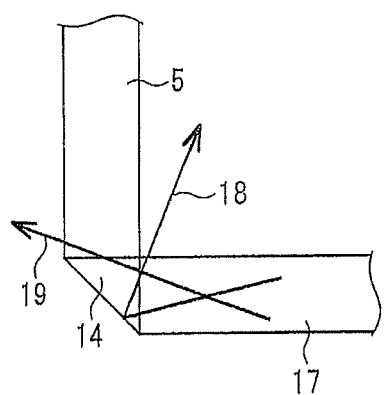
FIG. 9

The following explains Embodiment 2 of the present invention, with reference to FIGS. 7 through 9. Note that members given the same reference numerals as the members explained in Embodiment 1 respectively have identical functions and the explanations thereof are omitted.

(Configuration of Solar Simulator 30a)

FIG. 7 is a diagram illustrating a configuration of a relevant part of a solar simulator 30a according to one embodiment of the present invention. FIG. 8 is a diagram magnifying a part of the solar simulator 30a. As shown in FIGS. 7 and 8, the solar simulator 30a includes a cube wavelength-selecting mirror 16 and a coupler 17, in addition to the members included in the solar simulator 30 of Embodiment 1.

In the solar simulator 30a, a xenon light source 1 and a reflector 3 are disposed in a position apart from a light reflecting section 14, for preventing stray light. The coupler 17 is provided between the reflector 3 and the light reflecting section 14. The coupler 17 is made of a light guiding body. Xenon light having entered from the reflector 3 passes through this coupler 17 and exits to the light reflecting section 14. By the light reflecting section 14, the xenon light having entered the light reflecting section 14 from the coupler 17 is reflected and exits to an entrance face of a taper coupler 5.

The following explains a configuration and a function of the cube wavelength-selecting mirror 16. As shown in FIG. 8, the cube wavelength-selecting mirror 16 is configured such that 45° reflection prisms are attached to respective sides of the wavelength-selecting mirror 7.

FIG. 9 is a diagram illustrating a configuration of a bending section. As shown in FIG. 9, one bending section is formed by the coupler 17, the light reflecting section 14, and the taper coupler 5. Each of these members is made of a light guiding body made of, for example, glass. One end (exit surface) of the coupler 17 is attached to one plane (entrance surface) of the light reflecting section 14. One end of the taper coupler 5 (entrance face) is attached to the other surface (exit surface) of the light reflecting section 14. This configuration causes a problem shown in FIG. 9.

More specifically, because light 18 having passed through the coupler 17 is not sufficiently reflected, this light 18 does not enter the entrance face of the taper coupler 5. Meanwhile, light 19 having passed through the coupler 17 does not strike a reflection surface of the light reflecting section 14. Accordingly, the light 19 does not enter the entrance face of the taper coupler 5. In other words, both the light 18 and the light 19 may cause light loss, leaking out from the bending section. This causes a problem such that a radiation directivity of the xenon light is disordered at the bending section due to the occurrence of the light loss.

In the solar simulator 30a of the present embodiment, the above problem is solved by using the cube wavelength-selecting mirror 16. The 45 degree prisms are attached to the respective sides of the cube wavelength-selecting mirror 16. This provides an effect such that reflectance of the light is uniformed by the upper and lower surfaces of the cube wavelength-selecting mirror 16. This effect prevents an increase in a scale of disorder in the radiation directivity caused at the bending section.

(Effects of Present Embodiment)

The following explains effects of the solar simulator 30a of the present embodiment, with reference to FIGS. 10 and 11. FIG. 10(a) is a diagram illustrating directional distribution of radiation of the xenon light that has not yet entered the taper coupler 5. FIG. 10(b) is a diagram illustrating directional distribution of radiation of the xenon light that has exited from the taper member 8. FIG. 11(a) is a diagram illustrating directional distribution of radiation of the halogen light that has not yet entered a taper coupler 6. FIG. 11(b) is a diagram illustrating directional distribution of radiation of the halogen light that has exited from the taper member 8.

As shown in FIGS. 10(a) and 11(a), before entrance to the taper member 8, the directional distribution of the radiation of the xenon light is different from the directional distribution of the radiation of the halogen light. In other words, the directional distribution of the radiation of the xenon light has one peak, while the directional distribution of the radiation of the halogen light has two peaks. If both types of light (precisely, synthesized light of the xenon light and the halogen light) in such conditions enter the light guide plate 9, light for irradiation onto the irradiation-target surface 12 from the light guide plate 9 becomes uneven.

Meanwhile, as shown in FIGS. 10(b) and 11(b), after the exit from the taper member 8, the directional distribution of the radiation of the xenon light substantially coincides with the directional distribution of the radiation of the halogen light. In particular, in the present embodiment, widths of graphs each illustrating the directional distribution of the radiation substantially coincides with each other. Further, angle components on the graphs also coincides with each other in regard to quantities. Accordingly, after transmission through the taper member 8, the radiation directivity of the xenon light and radiation directivity of the halogen light coincide with each other more strictly as compared with the case of Embodiment 1. Therefore, when these types of light (synthesized light) enter the light guide plate 9, uniformity of light for irradiation onto the irradiation-target surface 12 from the light guide plate 9 is further improved.

Note that the present invention is not limited to the embodiments described above. A person of ordinary skill in the art may variously change/modify the present invention within the scope of claims. That is, within the scope of claims, technical means modified as appropriate may be combined and a new embodiment may be obtained.

(Other Configurations)

The present invention may be achieved in the following configurations, for example.

(First Configuration)

A solar simulator including:

a xenon light source;

a first optical filter adjusting a light emission spectrum of the xenon light source;

a halogen light source;

a second optical filter adjusting another light emission spectrum of the halogen light source;

a wavelength-selecting mirror reflecting one of a short wavelength component of xenon light emitted from the xenon light and a long wavelength component of halogen light emitted from the halogen light, and transmitting the other one of the short wavelength component and the long wavelength component;

a light guide plate which the xenon light having passed through the first optical filter and the halogen light having passed through the second optical filter enter; and light extraction means for extracting propagated light from the light guide plate, the light extraction means being formed in the light guide plate; and means for uniforming incident directivities of respective types of incident light from the xenon light source and the halogen light source, the means for uniforming incident directivities being disposed between the wavelength-selecting mirror and a position from which the light extraction means extends in the light guide plate.

(Second Configuration)

The solar simulator according to the first configuration, wherein the means for uniforming incident directivities is a taper-member whose thickness varies from an entrance side to an exit side.

(Third Configuration)

The solar simulator according to the second configuration, wherein the means for uniforming incident directivities is added as prisms inclined at 45 degrees, the prisms respectively provided on both sides of the wavelength selecting mirror so as to form one unit.

Further, preferably, a first light source is the xenon light source emitting the xenon light being first light; and a second light source is the halogen light source emitting the halogen light being second light.

Further, preferably, the thickness of the light transmitting means linearly decreases from the entrance surface of the light transmitting means to the exit surface of the light transmitting means.

According to the above configuration, it is possible to obtain an effect of coinciding radiation directivities of light by use of light transmitting means having a simple configuration.

Further, the light selecting means preferably selects the short wavelength component having a wavelength of 750 nm or less from the first light and the long wavelength component having a wavelength of 750 nm or more from the second light.

According to the above configuration, it is possible to remove an intense bright-line component in the light emission spectrum of the light emitted from the first light source. This provides an effect that an air mass filter can be easily designed.

Further, preferably, the light selecting means is a 45 degree wavelength selecting mirror reflecting one of the first light and the second light and transmitting the other one of the first light and the second light.

According to the above configuration, the light selecting means preferably has two sides each provided with a prism inclined at 45 degrees.

According to the above configuration, even in a case where the radiation directivity of the light is disordered before entrance of the light into the light selecting means, further disorder of the light is prevented by the light selecting means provided with the prisms inclined at 45 degrees. Therefore, the radiation directivity of the light entering the light guide plate can be further uniformed.

Further, preferably, a width of the entrance plane of the light transmitting means is different by 17 mm or less from a width of the exit surface of the light transmitting means.

According to the configuration, it is possible to prevent light leakage from the light transmitting means.

In addition, the light transmitting means preferably has a length of 300 mm or less.

According to the configuration, it is possible to prevent light leakage from the light transmitting means.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention can be suitably used in testing, measurement, and experiment of a solar cell. Further, the present invention can be suitably used in fading and light resistance tests of cosmetics, coating materials, adhesives, and various other materials. Further, the present invention may also be suitably used for testing and experiment of photocatalyst and various other experiments requiring natural light.

Reference Signs List

1 Xenon Light Source (First Light Source)
2 Halogen Light Source (Second Light Source)
3 Reflector
4 Reflector
5 Taper Coupler
5a Air Mass Filter (First Optical Filter)
6 Taper Coupler
5b Air Mass Filter (Second Optical Filter)
7 Wavelength-Selecting Mirror (Light Selecting Means)
8 Taper Member (Light Transmitting means)
9 Light Guide Plate
10 Reflecting Mirror
11 Scattering Grooves (Light Scattering Means)
12 Irradiation-Target Surface
14 Light Reflecting Section
15 Reflecting Mirror
16 Cube Wavelength-Selecting Mirror
17 Coupler
30, 30a Solar Simulator

The invention claimed is:

1. A solar simulator performing irradiation of artificial sunlight on an irradiation-target surface, the solar simulator comprising:
   a first light source emitting first light;
   a first optical filter adjusting a light emission spectrum of the first light emitted;
   a second light source emitting second light different from the first light;
   a second optical filter adjusting another light emission spectrum of the second light emitted;
   light selecting means selecting a short wavelength component of the first light whose light emission spectrum is adjusted and a long wavelength component of the second light whose light emission spectrum is adjusted, and emitting the short wavelength component and the long wavelength component that are selected;
   light transmitting means transmitting the short wavelength component and the long wavelength component that are emitted, the light transmitting means having width gradually decreasing from an entrance plane for the short wavelength component and the long wavelength component to an exit plane for the short wavelength component and the long wavelength component;
   a light guide plate which the short wavelength component and the long wavelength component that exit from the light transmitting means enter; and
   light scattering means scattering, towards the irradiation-target surface, the short wavelength component and the long wavelength component that have entered the light guide plate, the light scattering means being formed on the light guide plate.

2. The solar simulator as set forth in claim 1, wherein:
   the first light source is a xenon light source emitting xenon light being the first light; and
   the second light source is a halogen light source emitting halogen light being the second light.

3. The solar simulator as set forth in claim 1, wherein the width of the light transmitting means linearly decreases from the entrance plane of the light transmitting means to the exit plane of the light transmitting means.

4. The solar simulator as set forth in claim 1, wherein the light selecting means selects the short wavelength component having a wavelength of 750 nm or less from the first light and the long wavelength component having a wavelength of 750 nm or more from the second light.

5. The solar simulator as set forth in claim 1, wherein the light selecting means is a 45 degree wavelength selecting mirror reflecting one of the first light and the second light and transmitting the other one of the first light and the second light.

6. The solar simulator as set forth in claim 5, wherein the light selecting means has two sides each provided with a prism inclined at 45 degrees.

7. The solar simulator as set forth in claim 1, wherein a width of the entrance plane of the light transmitting means is different by 17 mm or less from a width of the exit plane of the light transmitting means.

8. The solar simulator as set forth in claim 1, wherein the light transmitting means has a length of 300 mm or less.

* * * * *